United States Patent Office 3,394,195
Patented July 23, 1968

3,394,195
RECOVERY OF ALCOHOL FROM BY-PRODUCTS OF THE OXIDATION OF ALUMINUM ALKYLS
Leonard N. Conley, Jr., Slaughter, and Leslie L. Sims and Charlie F. Yancey, Baton Rouge, La., assignors to Ethyl Corporation, New York, N.Y., a corporation of Virginia
No Drawing. Filed Jan. 28, 1965, Ser. No. 428,876
2 Claims. (Cl. 260—638)

ABSTRACT OF THE DISCLOSURE

By-products of the oxidation of aluminum alkyl materials to produce aluminum alkoxides are separated from the alkoxides and oxygenated molecules contained therein and hydrogenated to produce primary alcohols. In various embodiments the hydrogenation is conducted before and after separation of the oxygenated materials from hydrocarbons. In preferred embodiments the oxygenated molecules are hydrogenated in several separate steps under various degrees of severity.

---

This invention relates to the production of alcohols by aluminum chemistry and in greater particularity to the recovery of by-products produced in the oxidation of aluminum alkyls to produce aluminum alkoxide at an intermediate stage in the overall process.

When alkyl aluminum compounds are oxidized to produce alkoxy aluminum compounds, numerous by-product materials are produced. The oxidation of alkyl aluminum compounds is discussed in U.S. Patent 2,892,858 of Karl Ziegler. The principal by-products of oxidation are paraffins, esters, alcohols, aldehydes and olefins. These materials are contained in an oxidation solvent, usually a hydrocarbon of a different molecular length from the by-product materials involved so as to be readily separable therefrom by simple processes such as distillation. Thus the output of the alkyl aluminum oxidation will contain a dilute (hydrocarbon) solution of the desired alkoxides, esters, aldehydes, alcohols together with paraffins and olefins which correspond in molecular size to the alkyl components of the alkyl aluminum materials oxidized.

The by-products in the foregoing stream are produced in sufficient quantity so as to have a profound effect upon the economics of the overall process and cannot be merely discarded without adverse effect upon the required selling price for product alcohols or upon profit margins from the operation of such a plant.

The wide variety and molecular weight of the materials involved makes these materials undesirable for handling as separate by-products on a commercial basis and hence it is desirable that in so far as is possible they be converted to product alcohols.

It is accordingly an object of the present invention to provide a system for recovering by-product materials produced in the oxidation of aluminum alkyls to aluminum alkoxides.

Another object of the present invention is to provide a process whereby the by-products of oxidation of aluminum alkyls can be economically hydrogenated to convert them to recoverable alcohols with a minimum production of paraffins.

Other and further objects and features of the present invention will become apparent upon careful consideration of the following detailed description.

In accordance with the teachings of the present invention, the by-products of the oxidation of aluminum alkyls or their derivatives, which may consist of esters, aldehydes, alcohols, olefins and paraffins, are separated from the aluminum alkoxide and are hydrogenated whereby esters and aldehydes are converted to alcohols, hydrogenation being conducted under conditions which do not adversely affect alcohols present. Olefins and paraffins are removed at appropriate stages of the process by use of various combinations of adsorption, extraction, and distillation in various sequences which combine in particularly advantageous apparatus arrangements to produce the desired conversions with minimum of expense. In some instances due primarily to reasons beyond the control of the present process, hydrogenation may be particularly expensive to perform. In other situations hydrogenation expense may not be such a problem, particularly where low cost or "flare" hydrogen is readily available. Thus to provide the utmost flexibility and utility for the present invention, several overall combinations are exemplified, some requiring a greater hydrogenation effort than others.

A first embodiment of the present invention considers that hydrogenation is comparatively expensive to perform and seeks to minimize the amount of hydrogenation required. One feature of this arrangement however is that the recovery of ester value is not as complete as may be desired in some instances. In those instances where hydrogenation can be performed more economically, the arrangements of the second and third embodiments recover a greater proportion of the value of the ester content of the by-product stream. The third embodiment, despite somewhat additional complexity, achieves high recovery of ester values with comparatively low hydrogenation requirements.

In the first embodiment of the present invention the alkoxide stream from the oxidation of aluminum alkyls is first "flash" distilled to separate the solvent hydrocarbon and the by-product materials from the aluminum alkoxide. Oxidation solvents and distillation are discussed in British Patent 811,976. The aluminum alkoxide is passed on to further processing leading toward the production of the desired alcohols and the flashed or overhead material obtained is delivered to an adsorption or extraction system wherein the alcohols, aldehydes and esters contained therein are separated from the paraffin and olefin.

In general, the ester content of the distillation overhead will amount to approximately ⅓ of the total oxygenated by-product material remaining after alkoxide removal.

A preferred separation material for the esters, aldehydes and alcohols is silica gel which can be employed in numerous configurations such as powder or pellets, pellets typically of the order of ⅛" being preferable. Other suitable adsorbent materials are oxides, sulfides and salts of aluminum, magnesium, calcium, zinc and chromium, activated alumina, activated charcoal, diatomaceous earth, and activated clays.

The adsorption is conducted at a temperature from about 40° F. to about 200° F., preferably from about 70° F. to about 125° F. and typically at 100° F. The pressure maintained in adsorption ranges from about atmospheric to about 1000 p.s.i.g., preferably from about 10 p.s.i.g. to about 100 p.s.i.g., typically 30 p.s.i.g. Typical flow rates employed in adsorption range from about .05 to about 5, preferably from about 0.1 to about 0.5, typically 0.3, all expressed in terms of volume of feed material per hour per volume of adsorption bed based upon the preferred ⅛" pellets. It is of course obvious that variations in these ranges are possible for other adsorbent materials and configurations. In connection with the foregoing typical adsorber conditions, a typical stream from which the alkoxide has been removed may contain the following materials:

| | Parts, (weight) |
|---|---|
| Oxidation solvent | 75 |
| Other hydrocarbons | 17 |
| Esters | 3 |
| Aldehydes | 2 |
| Alcohols | 3 |

In practice, the adsorption capacity of the bed will in general be reached in approximately 8 hours of operation. Following this adsorption phase, recovery of the adsorbed material and preparation of the bed for a succeedent cycle of adsorption operation is required. It is evident that for continuous operation two or more beds are preferable, operative in an alternate fashion, however storage can be employed to advantage should a single large adsorber be desired.

The recovery of adsorbed materials presents a significant problem since as a practical matter additional complication with different solvents is undesired. The removal from the bed of excess paraffin and olefin is undertaken with a hydrocarbon more volatile than the desirable adsorbed material so as to facilitate subsequent separations. The solvent preferably has from 6–10 carbon atoms per molecule and can be saturated or unsaturated, branched or straight chain, such as octane or octene-1. Such elutant will remove adsorbed esters to a significant and undesired extent, however it was discovered that by employing a laminar flow, one volume displacement eluting operation, that the paraffins and higher olefins could be displaced ahead of the octane elutant, leaving the adsorber as mechanically contained liquid little more than the octane elutant itself. This mechanically contained material is then drained off and returned to the adsorber feed for the next cycle wherein the dissolved by-products are recovered. Residual octane elutant remaining in the bed after the drain-off is removed from the bed by flushing with an inert gas, such as nitrogen, in a closed loop system including a condenser by means of which vaporized elutant is recovered.

Actual recovery of the adsorbed by-products remaining in the bed is accomplished with an alcohol solvent such as methanol, however other alcohols such as ethanol and isopropanol can be used as well as glycols, however expensive solvents are usually less preferred because of the extreme economizing measures they require. The alcohol solvent is passed through the adsorption bed, typically being employed in a quantity of .3 volumes solvent per volume of bed based on ⅛" pellets. Following this the methanol is drained off and residual methanol is removed by again flushing the bed with an inert gas in a closed loop system. In this instance the bed is heated to approximately 110° C. in 3 hours to expedite the removal of the methanol. Actually this is not adequate to entirely remove all traces of methanol, it having been found more practical not to seek complete removal but to merely provide somewhat increased adsorption bed volume over that required for complete methanol removal. The foregoing figures as to volume, size, throughput, etc. all take into consideration this increased size requirement.

Methanol solution recovered is distilled to remove methanol and octane. This provides a concentrate of alcohol, aldehyde and ester. It is this material which is delivered to the hydrogenator, and, being a concentrated material, it can be handled in a hydrogenator of comparatively small volume. The most difficult task performed by this hydrogenator is the conversion of esters into alcohols requiring operation at elevtaed pressures from about 1000 to about 10,000 p.s.i.g., preferably about 2000 to about 3500, typically 2500 p.s.i. High temperatures from about 150 to 350° C., preferably from 200–300° C., typically 275° C., are desired, the higher temperatures generally being associated with short contact times.

Any suitable hydrogenation catalyst can be used such as oxides and sulfides of chromium, molybdenum, tungsten, nickel, copper, zinc and mixtures of these compounds as well as mixtures of the compounds with the various elements themselves. Various carriers can be used such as clay, kieselguhr and alumina. Exemplary catalysts include zinc chromate, copper chromite, barium promoted copper chromite, and the like.

A preferred catalyst is pelletized copper chromite which is typically prepared by the decomposition of basic copper chromate. Hydrogenator space velocity is of the order of 0.5 cubic feet of feed material per hour per cubic foot of catalyst where the catalyst is ⅛" pellets of copper chromite. Hydrogen circulation is approximately 2 volumes per volume of by-product fed. As mentioned in the foregoing, a recovery of the value of material in the ester of the order of 70 percent is readily obtainable which is normally satisfactory particularly where expenses entailed in hydrogenation must be limited.

Where higher recovery of the ester is desired and additional hydrogenation capability is available or practical, it is advantageous to perform the hydrogenation after separation of the alkoxide and prior to other separation of the by-products. In this way, esters are converted to alcohols easing separation problems since in general the separation of alcohols from the other materials involved is considerably easier than the separation of esters from the other materials. In carrying out this second embodiment, the oxidation effluent is first "flash" distilled as before to separate the aluminum alkoxide, following which the entire by-products stream containing the paraffin and the olefin as well as the hydrocarbon solvent (this latter at least in part) is delivered to the hydrogenator. This results in a more dilute hydrogenation feed, typically approximately 8 percent ester in comparison to the 35 percent ester in the concentrated feed of the first embodiment. This requires a considerably larger volume for the hydrogenator and in addition the olefin content of the feed will require the consumption of hydrogen in saturation thereof. The lower concentration will in general require higher space velocities to achieve usable hydrogenation throughput capability without considerably larger apparatus, typical flow rates being up to 1½ cubic feet of feed per hour per cubic foot of catalyst based upon ⅛" pellets of copper chromite. In general somewhat more severe conditions are also preferrd to increase hydrogenation capacity, pressures of from about 2000 to 5000 p.s.i. and temperatures from about 225–350° C. being preferred, with 3000 p.s.i. and 275° C. being typical.

The hydrogenation of this second embodiment converts olefins to paraffins and the other convertible materials, namely esters and aldehydes, to alcohols so that the hydrogenator effluent contains as a practical matter only paraffins and alcohols. Recovery of the alcohol from the paraffin stream is preferably accomplished by adsorption or by extraction since distillation is rendered difficult by reason of the molecular weight range. Adsorption is in general conducted in accordance with the adsorption of the first embodiment described above.

Extraction is preferably conducted as a liquid-liquid operation employing countercurrent flow of wet methyl alcohol and a hydrocarbon having a different density than the alcohol by-products involved, such as paraffin having from 2–8 carbon atoms per molecule or a much higher range such as 24+ carbon atoms per molecule. Examples are ethane, propane, butane, white oil, and a commercial paraffin oil product known as Primol 355 which is a mixture of paraffin hydrocarbons having a specific gravity of 0.886 at 55° C. and a boiling range of 700–910° F. at 1 atmosphere pressure. In such extraction the feed to the extractor occurs at an intermediate point. The methyl alcohol will remove the alcohols and the hydrocarbon will remove the paraffins, the two different types of materials being carried in countercurrent fashion achieving a high degree of separation efficiency. The dual solvent arrangement is employed because the methanol undesirably takes with it some paraffin, while the paraffin used for extraction travels in the opposite direction and removes the paraffin extracted from the by-products by the methanol. The overall result is a clean separation of the alcohols by-products. This extraction technique is directly usable as an alternate to adsorption in all sequences of separate hydrogenation, the first embodiment, this second embodiment, and others.

In a third embodiment of the features of the present invention, the small hydrogenation requirements of the "adsorb or extract first" arrangement can be approached as well as the more efficient adsorption of the second embodiment. The price of this is slight additional complexity requiring two small hydrogenators with multiple initial flash distillation, the first distillation stripping everything from the alkoxide, and the second distillation stripping the other materials removed from the alkoxide by the first flash distillation from the heavy ester co-present. The ester thus obtained is hydrogenated to alcohol using conditions similar to those of the first arrangement.

The overhead from the second flash distillation contains principally paraffin, olefin, alcohol and aldehyde. This material is then passed to an adsorber or to the countercurrent methanol-hydrocarbon extractor where the alcohol and aldehydes are separated from the paraffin and olefin.

Where adsorption is selected, the adsorbed material is then recovered with a 1-volume octane wash followed by removal of the octane from the by-product materials by distillation leaving the alcohols and aldehydes. This mixture is then hydrogenated to convert the aldehydes to alcohols. This latter hydrogenation can be accomplished in the same hydrogenator as is used for ester hydrogenation simultaneously or on an alternate basis however in general it is preferable to provide a second hydrogenator because the aldehyde hydrogenation does not require the high pressure that is required to shift the ester equilibrium to the alcohol condition but can be accomplished with the same catalyst system at a temperature of the order of 125° C. and a pressure of the order of 500 p.s.i. Thus the volume of material subjected to high pressure operation is markedly reduced by a dual hydrogenator system.

With countercurrent extraction, as with a heavy paraffin such as the Primol 355 identified herein, the alcohol and aldehyde are removed for the most part in the alcohol extract and the ester and hydrocarbon are removed in the oil extract. The extracting alcohol will generally be selected to be readily removable by a simple "flash" distillation following which the residue can be subjected to low pressure hydrogenation to convert the aldehyde to alcohol. The extracting heavy oil can be removed from the oil extracted phase or allowed to remain therein during high pressure hydrogenation conversion of esters to alcohols.

Example I

Tridodecyl aluminum was oxidized in octane-1 solvent to produce aluminum alkoxide and by-products. The oxidation product was distilled to remove the alkoxide contained therein providing a uniform condensate for all further examples. It is noted that the ratios of the components of the condensate may vary depending upon oxidation and distillation conditions but that such a ratio is not critical, uniformity of starting material merely being desirable to facilitate comparison of results of different runs.

The condensate analyzed as follows:

| | Parts by weight |
|---|---|
| Ester | 0.9 |
| Dodecyl alcohol | 4.7 |
| Dodecyl aldehyde | 0.9 |
| Dodecene-1 | 4.5 |
| Dodecane | 7.8 |
| Octene-1 (oxidation solvent) | 81.2 |
| | 100.0 |

A portion of the condensate was passed over a 168 cubic cm. bed of 28–200 mesh silica gel at 41° C., 3 p.s.i. gage, using a uniform flow rate during the period of 123 minutes, corresponding on a volumetric basis to approximately 0.013 volumes of condensate fed per hour per unit volume of adsorbent, to adsorb the oxygenated materials permitting the hydrocarbons (paraffin and olefin) to pass through.

The bed was drained, then flushed with one volume of octene-1 in laminar flow. The flush effluent was retained and later added to the condensate. Aside from being slightly low in dodecane the flush analysis corresponded closely to the uniform condensate analysis.

The bed was washed with 295 cubic cm. of methanol of 41° C. and 3 p.s.i.g. at a uniform flow rate over a period of 151 minutes, drained, and blown with nitrogen for 16 hours at 150° C. and 3 p.s.i. at a flow rate of 2.2 liters per hour.

The adsorbed product eluted by the methanol was distilled at 64.7° C. and atmospheric pressure to remove methanol.

The residue from the distillation was distilled at 121.3° C. and atmospheric presssure to remove octene-1.

The by-product materials remaining were as follows:

| | Parts by weight |
|---|---|
| Ester | 12.6 |
| Dodecyl aldehyde | 11.7 |
| Dodecyl alcohol | 75.7 |
| | 100.0 |

Hydrogenation of these by-product materials at 275° C. and 3000 p.s.i.g. for a period of 2½ hours with copper chromite catalyst used a total of 442 ml. of hydrogen, 200 percent theoretical excess, fed at a uniform rate. Ester and aldehyde conversion was virtually complete, 110 parts of dodecyl alcohol being obtained as an average of several runs.

Example II

A portion of the residue of Example I remaining after distillation of the methanol, still containing octene-1 was hydrogenated at 125° C. and 500 p.s.i. with nickel catalyst for a period of ½ hour during which the aldehyde was converted to alcohol and the olefins were saturated. Samples were taken to confirm aldehyde conversion which was complete and then the material was hydrogenated as in Example I. On a basis comparable to Example I the averaged product (omitting paraffin) of the first hydrogenation was:

| | Parts by weight |
|---|---|
| Ester | 12.6 |
| Dodecyl alcohol | 87.2 |
| | 99.8 |

The second hydrogenation converted all ester to alcohol.

Example III

The uniform condensate of Example I was extracted with methanol and hevay oil (Primol 355) in a vertical countercurrent extraction column. The column was 1" diameter, 4 ft. long and provided with agitation by a finned rod rotated at 650 r.p.m. The condensate was fed to the mid-point of column, the heavy oil being fed near the top of the column, the methanol near the bottom, with alcohols and aldehydes being recovered at the top in a methanol solution and the paraffins and esters being recovered at the bottom in a heavy oil solution.

The heavy oil solvent was fed at the rate of 3.5 cc./minute and the alcohol solvent which was 98 percent methyl alcohol and 2 percent water was fed at the rate of 4.3 cc./minute. The condensate feed was at the rate of 2.0 cc./minute. The temperature was 41° C. and the pressure was atmospheric.

Recovery in the methyl alcohol phase:
(Percent of that fed recovered in the overhead material (alcohol phase).)

| | Percent |
|---|---|
| Alcohol | 92 |
| Aldehyde | 81 |
| Ester | 10 |
| Paraffin | 0.1 |

The alcohol extract phase was distilled to remove methanol and hydrogenated at low pressure of 500 p.s.i.g., 125° C., with nickel catalyst for ½ hour. The aldehyde was completely converted to alcohol and distilled from the ester residue.

The oil extract phase was hydrogenated at high pressure of 3000 p.s.i.g. at 275° C. with copper chromite catalyst for 2½ hours. The ester was completely converted to alcohol.

Example IV

A condensate containing a mixture of oxygenated materials obtained by oxidizing a mixture of tri-octyl aluminum, tri-decyl aluminum, tridodecyl aluminum, tritetradecyl aluminum and trihexadecyl aluminum was extracted with methanol and propane at 41° C. under autogenous pressure for 15 minutes. Extraction was in a vessel of 150 ml. volume, with 23 grams of propane, 32 grams of 94% methanol and 20 grams of condensate feed. The recovery of alcohols in the alcohol phase expressed as percentage of original alcohol in condensate was as follows.

Primary alcohol:

| | Percentage |
|---|---|
| $C_8$ | 85 |
| $C_{10}$ | 83 |
| $C_{12}$ | 74 |
| $C_{14}$ | 62 |
| $C_{16}$ | 57 |

The alcohol phase was hydrogenated at low pressure as in Example II converting aldehydes to alcohols and the propane phase was distilled to remove propane and hydrogenated at high pressure as in Example I, converting esters to alcohols.

Example V

Example III is repeated using propane as solvent in the ratio of 7.2 parts by volume to 4.3 parts of methanol (98%) and 5.0 parts of condensate. Alcohol recovery in the alcohol phase is greater than 90 percent. The alcohol phase is distilled to remove methanol. The paraffin phase is distilled to remove hydrocarbons, the oxygenated material residues of both phases are combined and hydrogenated in a single step at 3000 p.s.i.g. and a temperature of 275° C. with copper chromite catalyst for 2½ hours. The hydrogenation effluent is paraffin and alcohol.

Example VI

The condensate from Example I was distilled to remove the oxidation solvent and the residue was hydrogenated at high pressure as in Example I at 3000 p.s.i.g. and 275° C. with copper chromite catalyst for a period of 2½ hours during which the aldehyde and ester was converted to dodecyl alcohol, which was recovered.

From the foregoing it is obvious that considerable modification of the teaching of the present invention is possible without exceeding the scope thereof as defined in the appended claims.

What is claimed is:

1. A process for deriving alcohols from by-products produced in the oxidation of aluminum alkyls to aluminum alkoxide comprising,
    separating the alkoxide from the oxidation effluent to obtain a by-product stream,
    distilling the by-product stream to obtain a high boiling stream containing esters and a low boiling stream containing alcohols and aldehydes,
    separately catalytically hydrogenating the ester stream at pressure from about 1000 to about 10,000 p.s.i.g. and temperature from about 150° C. to about 350° C. to convert the esters to alcohols,
    removing hydrocarbons from the low boiling stream by feeding it into an intermediate point of countercurrent streams of an extractant alcohol selected from the group consisting of methanol, ethanol and isopropanol and an extractant hydrocarbon selected from the group consisting of ethane, propane, butane, white oil and a mixture of paraffinic hydrocarbons having a specific gravity of 0.886 at 55° C. and a boiling range of 700–900° F. at 1 atmosphere pressure, flash distilling the extracted low boiling stream to remove extractant alcohol therefrom,
    separately catalytically hydrogenating the extracted, flash distilled, low boiling stream at a lower suitable pressure to convert the aldehydes to alcohols,
    and recovering the alcohols so produced.

2. A process for deriving alcohols from by-products produced in the oxidation of aluminum alkyls to aluminum alkoxide comprising,
    separating the alkoxide from the oxidation effluent to obtain a by-product stream,
    separating the by-product stream into a stream containing esters and a stream containing alcohols and aldehydes by feeding into an intermediate point of countercurrent streams of an extractant alcohol selected from the group consisting of methanol, ethanol and isopropanol and an extractant hydrocarbon selected from the group consisting of ethane, propane, white oil and a mixture of paraffinic hydrocarbons having a specific gravity of 0.886 at 55° C. and a boiling range of 700–900° F. at 1 atmosphere pressure,
    separately catalytically hydrogenating the ester stream at pressure from about 1000 to about 10,000 p.s.i.g. and temperature from about 150° C. to about 350° C. to convert the esters to alcohols,
    flash distilling the stream containing alcohols and aldehydes to remove extractant alcohol therefrom,
    separately catalytically hydrogenating the flash distilled stream containing alcohols and aldehydes at a lower suitable pressure to convert the aldehydes to alcohols,
    and recovering the alcohols from the hydrogenation effluents.

References Cited

UNITED STATES PATENTS

| 2,596,160 | 5/1952 | McGrath | 260—643 |
|---|---|---|---|
| 2,610,977 | 9/1952 | Gallo | 260—643 |
| 2,619,497 | 11/1952 | Hockberger | 260—643 |
| 2,621,203 | 12/1952 | Cope | 260—643 |
| 2,647,139 | 7/1953 | Burton | 260—643 |
| 2,653,959 | 9/1953 | Moore et al. | 260—643 |
| 2,696,304 | 12/1954 | Gilmore. | |
| 2,918,486 | 12/1959 | Binning et al. | 260—643 |
| 2,943,105 | 6/1960 | Caruthers | 260—643 |
| 3,104,251 | 9/1963 | Foster et al. | 260—632 |
| 3,270,065 | 8/1966 | Austin | 260—632 |

OTHER REFERENCES

Lobo et al.: "Chemical Engineering Progress," vol. 58, No. 5 (May 1962), pp. 85 to 88.

BERNARD HELFIN, *Primary Examiner.*

J. E. EVANS, *Assistant Examiner.*